United States Patent [19]
Iwamura et al.

[11] Patent Number: 5,600,720
[45] Date of Patent: Feb. 4, 1997

[54] ENCRYPTION APPARATUS, COMMUNICATION SYSTEM USING THE SAME AND METHOD THEREFOR

[75] Inventors: Keiichi Iwamura; Takahisa Yamamoto, both of Kawasaki, Japan

[73] Assignee: Canon Kabushiki Kaisha, Tokyo, Japan

[21] Appl. No.: 277,512

[22] Filed: Jul. 19, 1994

[30] Foreign Application Priority Data

Jul. 20, 1993 [JP] Japan .................................. 5-179232
Jul. 20, 1993 [JP] Japan .................................. 5-179241

[51] Int. Cl.$^6$ .................................................. H04L 9/26
[52] U.S. Cl. .................................................. 380/1; 380/46
[58] Field of Search ........................ 380/21, 1, 46, 380/49

[56] References Cited

U.S. PATENT DOCUMENTS

| | | |
|---|---|---|
| 4,369,434 | 1/1983 | Mueller. |
| 4,484,027 | 11/1984 | Lee et al. .................................. 380/21 |
| 4,860,353 | 8/1989 | Brown .................................. 380/50 |
| 5,060,265 | 10/1991 | Finkelstein .................................. 380/46 |
| 5,073,935 | 12/1993 | Pastor .................................. 380/30 |
| 5,321,752 | 6/1994 | Iwamura et al. .................................. 380/49 |
| 5,365,585 | 11/1994 | Puhl et al. .................................. 380/46 |
| 5,452,358 | 9/1995 | Normile et al. .................................. 380/46 |

FOREIGN PATENT DOCUMENTS

| | | |
|---|---|---|
| 1549067 | 1/1971 | Germany. |
| 2706421 | 2/1977 | Germany. |
| 1598415 | 9/1981 | United Kingdom. |

OTHER PUBLICATIONS

Eli Biham and Adi Shamir, *Differential Cryptanalysis of DES–Like Cryptosystems*, J. Cryptology (1991) 4:3–72, AT pp. 3–72.

Lenore Blum, et al., *Comparison of Two Pseudo–Random Number Generators*, Advances In Cryptology: Procedures Of Crypto 82, AT pp. 61–78.

Elwyn Berlekamp, Algebraic Coding Theory (McGraw–Hill 1968).

Whitfield Diffie And Martin Hellman, *New Directions In Cryptography*, Transactions on Information Theory, vol. IT–22, No. 6, Nov. 1976 at pp. 644–654.

Michael Blum and Silvio Micali, *How To Generate Cryptographically Strong Sequences Of Pseudo Random Bits*, Symposium On Foundations Of Computer Science, Nov. 3–5, 1982, at pp. 112–117.

Benny Chor and Oded Goldreich, *RSA/Rabin Least Significant Bits*, Advances in Cryptology: Proceedings of Crypto 84, at pp. 303–313.

*Primary Examiner*—Salvatore Cangialosi
*Attorney, Agent, or Firm*—Fitzpatrick, Cella, Harper & Scinto

[57] ABSTRACT

In order to attain high speed and secure encryption, a communication apparatus comprises a random number generation circuit for sequentially generating random number sequences which assure difficulty in terms of amount of calculation in cryptoanalyzing the sequences based on output sequences while using a cryptographic key shared by partner stations as an initial value, and an encryption circuit for sequentially encrypting communication texts and outputting cryptograms in a transmitting station and sequentially cryptoanalyzing the cryptograms and outputting the same in a receiving station, faster than the sequential generation of the random numbers by the random number generation circuit.

16 Claims, 10 Drawing Sheets

ENCRYPTION APPARATUS, COMMUNICATION SYSTEM USING THE SAME AND METHOD THEREFOR

BACKGROUND OF THE INVENTION

1. Field of the Invention

The present invention relates to an encryption system, and more particularly to data security, acknowledgement of sender and receiver, sharing of cryptographic key and zero knowledge certification protocol in a field of cryptocommunication.

2. Related Background Art

Prior art encryption system may be classified into two major categories. In one category of encryption system, a cryptographic key may be cryptoanalyzed if a certain number of cryptograms are available, that is, all of subsequently outputted cryptograms can be readily cryptoanalyzed. Such an encryption system is referred to as a system A. Typical examples of the system A are the Feistel encryption such as DES (Data Encryption Standard) or FEAL (Fast Encryption Algorithm), or linear feedback shift register system (hereinafter LFSR system) or non-linear feedback shift register system which uses a shift register.

As shown in FIG. 12, the LFSR system comprises a stages of shift registers $R(t)=(r_s(t), r_{s-1}(t), \ldots, r_2(t), r_1(t))$ and tap train $(h_s, h_{s-1}, \ldots, h_2, h_1)$. It simultaneously performs the following operations for each time point (stop) to generate a pseudo-random number sequence.

(a) Output the bit $r_1(t)$ of the rightmost register as a pseudo-random sequence $$k_t = r_1(t)$$

(b) Shift right $r_s(t), r_{s-1}(t), \ldots, r_2(t)$ $$r_i(t+1) = r_{i+1}(t)$$

(i=1, 2, . . . , s–1)

(c) Calculate the bit $r_s(t+1)$ of the leftmost register based on the content of the register and the tap train.

$$r_s(t+1) = \sum_{i=1}^{s} h_i \cdot r_i(t) \bmod 2$$

To summarize the above, the pseudo-random number sequence generation algorithm of the LFSR system can be expressed by using an s-row and s-column matrix H as follows:

$$R(t+1)=H \cdot R(t) \bmod 2 \quad (1)$$

Namely, $$\begin{pmatrix} r_s(t+1) \\ r_{s-1}(t+1) \\ r_{s-2}(t+1) \\ \vdots \\ r_2(t+1) \\ r_1(t+1) \end{pmatrix} = \begin{pmatrix} h_s & h_{s-1} & \ldots & h_3 & h_2 & h_1 \\ 1 & 0 & \ldots & 0 & 0 & 0 \\ 0 & 1 & \ldots & 0 & 0 & 0 \\ \vdots & \vdots & & \vdots & \vdots & \vdots \\ 0 & 0 & \ldots & 1 & 0 & 0 \\ 0 & 0 & \ldots & 0 & 1 & 0 \end{pmatrix} \begin{pmatrix} r_s(t) \\ r_{s-1}(t) \\ r_{s-2}(t) \\ \vdots \\ r_2(t) \\ r_1(t) \end{pmatrix}$$

By properly selecting the tap train of the s-stage LFSR, a pseudo-random bit sequence having a maximum period of $2^s-1$ may be generated and the sequence thereof is the maximum period sequence described above.

However, in the random number sequence generation method using the LFSR, the s-stage tap train $(h_s, h_{s-1}, \ldots, h_2, h_1)$ may be determined based on 2s-bit output pseudo-random number sequence in the following manner by utilizing the linearity of the LFSR.

Assuming that the output pseudo-random number sequence is $k_1, k_2, \ldots, k_{2s}$, the contents $R(t)$ of the reigster at time points t (t=1, 2, . . . , s+1) are represented by:

$$R(1) = (k_s, k_{s-1}, \ldots, k_1)^T$$
$$R(2) = (k_{s-1}, k_s, \ldots, k_2)^T$$
$$\ldots$$
$$R^{(s+1)} = (k_{2s}, k_{2s-1}, \ldots, k_{s-1})^T$$

where $^T$ represents transposition. When matrices X and Y are given by:

$$X=(R(1), R(2), \ldots, R(s))$$

$$Y=(R(2), R(3), \ldots, R(s+1))$$

the following relation is met from the formula (1);

$$Y=H \cdot X,$$

that is;

$$H=Y \cdot X^{-1} \quad (2)$$

Thus, H is determined and the tap train is determined.

Namely, the period of the random number sequence is $2^s-1$ and the construction of the LFSR is determined by 2s bits. In this case, since all random number sequences generated after that time point are known, the use of the output random number sequence for the encryption purpose is not appropriate in terms of security.

It is known that the number of random numbers which require the analysis of the output random number sequences increases when the non-linear feedback shift register is used. However, the LFSR of a minimum number of stages which can generate the sequence may be determined by Berlekamp-Massey algorithm (E. R. Berlekamp "Algebraic Coding Thoery", McGraw-Hills Books Company, 1968), and the random number sequence generation system using the non-linear feedback shift register may be analyzed by the method of the formula (2).

In the DES and the FEAL, a search faster than an overall key search (search for $2^{56}$ keys) may be attained by a cryptanalysis method called a differential cryptanalysis (E. Biham, A. Shamir: "Differential Cryptanalysis of DES-like Cryptosystems", Journal of Cryptology, Vol. 4, No. 1, pp. 3–72, 1992). In a recent study, it is shown that the 16-stages of DES can be cryptoanalyzed by $2^{47}$ known ordinary text attack, the 8-stage DES can be cryptoanalyzed by $2^{21}$ known ordinary text attack, and the 8-stage FEAL can be cryptoanalyzed by $2^{15}$ known ordinary text attack, and it is expected that the number of searches will decrease as the study progresses.

However, those systems are frequently used in practice because high speed encryption operation may be attained by a simple operation. Thus, the system A attains the high speed operation although it does not assure the security.

On the other hand, unlike the system A, an encryption system in which it is very difficult to predict an encrypted output which will be subsequently generated from only the encrypted output generated before a certain time point is referred to as a system B. Where the encrypted output is a random number, a typical example of the system B is a square residue operation method disclosed in an article "Advances in Cryptology" (PLENUM PRESS, pp. 61–78, 1983). In this method, when the random number sequence is represented by $\{b_1, b_2, \ldots, \}$, the bit $b_i$ is given by;

$$x_{i+1} = x_i^2 \bmod n$$

(i=0, 1, 2, ...)

$$b_i = lsb(x_i)$$

(i=0, 1, 2, ...)

where $x_0$ is an arbitrarily given initial value, $n = p \cdot q$ (p, q are principle numbers) and $lsb(x)$ represents a least significant bit of x.

It is known that the determination of $b_{i+1}$ from only the random number sequence $\{b_1, b_2, \ldots, b_i\}$ generated by this method is as much time-taking as that for factorizing n. Namely, the amount of calculation for determining the random numbers generated after a time point based on the random numbers generated by that time point is equivalent to the amount of calculation required for factorizing n. The random number given by this method is hereinafter referred to as a square residue random number. ($b_1$ may not comprise only the least significant bit of $x_i$ bit it may comprise the least significant bit to the $\log_2 n$ bit.)

However, in order to make it difficult in terms of the amount of calculation to factorize n, it is necessary to increase p and q to several hundreds of bits. The random numbers generated by the method which makes it difficult in terms of the amount of calculation to predict the random numbers which will be generated subsequently based on the random number sequence generated by that time point is referred to as cryptologically secure pseudo-random numbers.

In the above case, the amount of calculation for calculating $x_{i+1} = x_i^2 \bmod n$ is also large and the random number cannot be generated at a high speed. Namely, as opposed to the system A, the system B assures the security but cannot attain the high speed operation. Another example of the system B is a discrete logarithmic random number (M. Blum and S. Micali: "How to generate cryptographically strong sequences of pseudo-random bits", 23rd IEEE FOCS, pp. 112–117, 1982) which assures the same security as that of determining an RSA random number (B. Chor and O. Goldreich: "RSA/Rabin least significant bits are ½+1/ poly(n) secure", Advances in Cryptology: Proceedings of Crypto 84, G. R., 1984) or discrete logarithm. It still has a similar feature that it assures the security but does not attain the high speed operation. Thus, the system A allows the high speed operation but does not assure the security while the system B, unlike the system A, assures the security in terms of the amount of calculation but does not attain the high speed operation.

SUMMARY OF THE INVENTION

It is an object of the present invention to provide an encryption apparatus which is compatible for the high speed of the system A and the security of the system B, a communication system using the same and a method therefor.

According to one aspect, the present invention which achieves these objectives relates to an encryption apparatus comprising: random number generation means for sequentially generating random number sequences which assures difficulty in terms of amount of calculation in cryptoanalyzing the sequences based on output sequences while using a cryptographic key shared by a sender and a receiver as an initial value; and encryption means for encrypting communication data faster than the sequential generation of the random number sequences by the random number generation means based on a predetermined parameter and sequentially outputting the cryptographic sequences; the parameter being sequentially updated based on the random numbers sequentially generated by the random number generation means.

In accordance with another aspect, the present invention relates to a communication system comprising: a transmission unit including first random number generation means for sequentially generating random number sequences which assures difficulty in terms of amount of calculation in cryptoanalyzing the sequences based on output sequences while using a cryptographic key shared by a sender and a receiver as an initial value; and encryption means for encrypting communication data faster than the sequential generation of the random number sequences by the random number generation means based on a predetermined parameter and sequentially outputting the cryptographic sequences; and a receiver unit including second random number generation means for generating the same random number sequences as those of the first random number generation means while using the cryptographic key as an initial value and cryptoanalysis means for cryptoanalyzing the cryptograms by inverse operation by the encryption means based on the predetermined parameter to sequentially output communication texts; the parameter to the encryption means being sequentially updated based on the random numbers sequentially generated by the first random number generation means; and the parameter to the cryptoanalysis means being sequentially updated based on the random numbers sequentially generated by the second random number generation means.

In accordance with another aspect, the present invention relates to a communication method comprising the steps of: in a transmission station, sequentially generating random number sequences which assure difficulty in terms of amount of calculation in cryptoanalyzing the sequences based on output sequences while using a cryptographic key shared by a sender and a receiver as an initial value; and sequentially transmitting to the receiver cryptograms by encrypting communication texts faster than the sequential generation of the random number sequences based on a parameter updated in accordance with the sequentially generated random number sequences; and in a receiving station, sequentially generating the same random number sequences as the random number sequences while using the cryptographic key as an initial value; and sequentially outputting communication texts by cryptoanalyzing the cryptograms by inverse operation to the encryption based on the parameter updated in accordance with the same random number sequences.

In accordance with another aspect, the present invention relates to an encryption apparatus comprising: hold means for holding data; conversion means for receiving the data held by the hold means and converting the input data based on a predetermined parameter; update means for updating the data held by the hold means in accordance with the conversion result by the conversion means; and output means for sequentially outputting a portion of the data held by the hold means as random number sequences.

In accordance with another aspect, the present invention relates to an encryption apparatus comprising: hold means for holding data; conversion means for receiving the data held by the hold means and converting the input data based on a predetermined parameter; update means for updating the data held by the hold means in accordance with the conversion result by the conversion means; output means for sequentially outputting a portion of the data held by the hold means as random number sequences; and calculation means for sequentially calculating parameter sequences which make it difficult to infer the sequences based on output sequences and changing the parameter.

In accordance with another aspect, the present invention relates to a communication system comprising: a transmission unit including first hold means for holding data, first conversion means for receiving the data held by the first hold means and converting the input data based on a predetermined parameter, first update means for updating the data held by the first hold means in accordance with the conversion result by the first conversion means; first output means for sequentially outputting a portion of the data held by the first hold means as random number sequences, and encryption means for encrypting communication text based on the random number sequences outputted by the first output means; and a receiver unit including second hold means for holding data, second conversion means for receiving the data held by the second hold means and converting the input data based on a predetermined parameter, second update means for updating the data held by the second hold means in accordance with the conversion result by the second conversion means; second output means for sequentially outputting a portion of the data held by the second hold means as random number sequences, and cryptoanalysis means for cryptoanalyzing cryptograms based on the random number sequences outputted by said second output means.

In accordance with another aspect, the present invention relates to a communication system comprising: a transmission unit including first hold means for holding data, first conversion means for receiving the data held by the first hold means and converting the input data based on a predetermined parameter, first update means for updating the data held by the first hold means in accordance with the conversion result by the first conversion means; first output means for sequentially outputting a portion of the data held by the first hold means as random number sequences, first calculation means for sequentially calculating parameter sequences which make it difficult to infer the sequences based on output sequences and changing the parameter, and encryption means for encrypting communication text based on the random number sequences outputted by the first output means; and a received unit including second hold means for holding data, second conversion means for receiving the data held by the second hold means and converting the input data based on a predetermined parameter, second update means for updating the data held by the second hold means in accordance with the conversion result by the second conversion means; second output means for sequentially outputting a portion of the data held by the second hold means as random number sequences, second calculation means for sequentially calculating parameter sequences which make it difficult to infer the sequences based on output sequences and changing the parameter, and cryptoanalysis means for cryptoanalyzing cryptograms based on the random number sequences outputted by the second output means.

In accordance with another aspect, the present invention relates to a communication method comprising the steps of: in a transmitting station, inputting data held by a first data hold unit to a first conversion unit; updating the data held in the first hold unit based on the conversion result; sequentially outputting a portion of data held in the first hold unit as random number sequences; and sequentially transmitting to a receiving station cryptograms encrypted based on the output random number sequences; and in the receiving station, inputting data held by a second data hold unit to a second conversion unit, updating the data held in the second hold unit based on the conversion result; sequentially outputting a portion of data held in the second hold unit as random number sequences; and cryptoanalyzing the cryptograms based on the output random number sequences.

In accordance with another aspect, the present invention relates to a communication method comprising the steps of: in a transmitting station, inputting data held by a first data hold unit to a first conversion unit, updating the data held in the first hold unit based on the conversion result; sequentially calculating parameter sequences which are difficult to be inferred from output sequences as the parameter to change the parameter; sequentially outputting a portion of data held in the first hold unit as random number sequences; and sequentially transmitting to a receiving station cryptograms encrypted based on the output random number sequences; and in the receiving station, inputting data held by a second data hold unit to a second conversion unit; updating the data held in the second hold unit based on the conversion result; sequentially calculating parameter sequences which are difficult to be inferred from output sequences as the parameters; to change the parameters; and sequentially outputting a portion of data held in the second hold unit as random number sequences; and cryptoanalyzing the cryptograms based on the output random number sequences.

Other objectives and advantages besides those discussed above shall be apparent to those skilled in the art from the description of the preferred embodiments of the invention which follows. In the description, reference is made to the accompanying drawings, which form a part thereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1A:
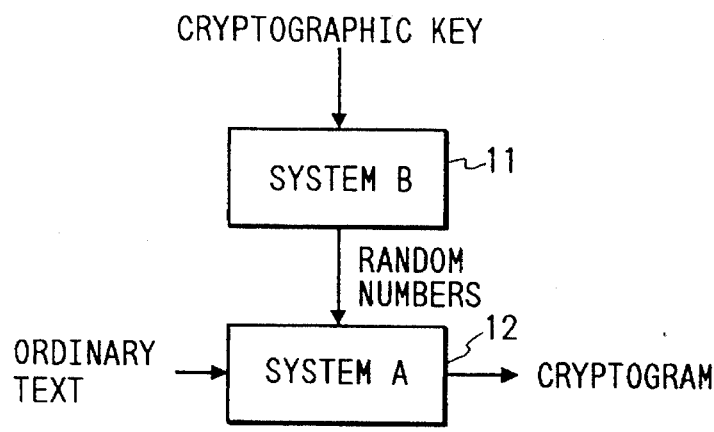
FIGS. 1A and 1B show basic configurations of an encryption apparatus and a random number generation circuit in accordance with the present invention.
Figure 1B:
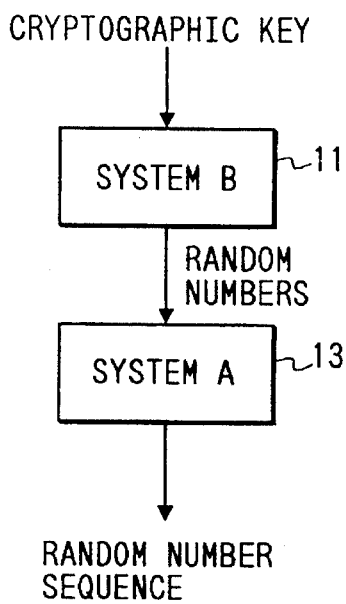

FIG. 1 shows a block diagram of a basic configuration of the encryption apparatus in accordance with one embodiment of the present invention. In FIG. 1A, an encryption circuit 12 is used for the circuit of the system A, and in FIG. 1B, a random number generation circuit 13 is used for the system A. The present embodiment comprises a first circuit (the encryption circuit 12 or the random number generation circuit 13) which uses the system A and a second circuit (the random number generation circuit 11) which uses the system B, and it controls the conversion system in the first circuit (the encryption circuit 12 or the random number generation circuit 13) by using the random number generated by the second circuit (the random number generation circuit 11) as a parameter while a cryptographic key shaped by a sender and a receiver being an initial value so that the high speed which is the feature of the system A and the security which is the feature of the system B are attained in the following manner.

The conversion scheme for the cryptographic key of the system A is changed by using the random number from the system B as a parameter before the number of cryptograms (or random number sequences) outputted by the encryption system (or the random number generation system) of the system A exceeds the number of cryptograms (or the random number sequences) required to cryptoanalyze the system A, or in the vicinity of equality of both so that the collection of cryptograms (or random number sequences) required for the cpyptoanalyzes is rendered difficult.

In this case, since it is sufficient to generate the random number by the system B before the number of cryptograms (or random number sequences) outputted by the encryption (or the random number generation) by the system A exceeds the number required for the cryptoanalysis of the system A, the random number generation of the system B need not be performed at a high speed. However, since the final output as the cryptogram (or the random number sequence) is from the system A, the high speed encryption (or the random number generation) of the system A may be attained as a whole.

As to the security, the collection of a number of cryptograms (or random number sequences) required for the cryptoanalysis of the system A is rendered difficult as described above. Even if the number of cryptograms (or random number sequences) required to cryptoanalyze the system A decreases in future as the study progresses so that the cryptoanalysis of the system A is enabled, the cryptoanalysis is limited to only the random numbers emptied to the system A from the system B and it is still difficult in terms of the amount of calculation to cryptoanalyze the cryptographic key unpitied to the system B based on the random numbers. Since the cryptographic key of the encryption. (or the random number generation) of FIGS. 1A and 1B is the cryptographic key emptied to the system B, the overall security is assured by the security of the system B.

Accordingly, the encryption which is compatible to the security and the high speed, which has heretofore been not attained, is realized.

[Embodiment 1]

Figure 2:
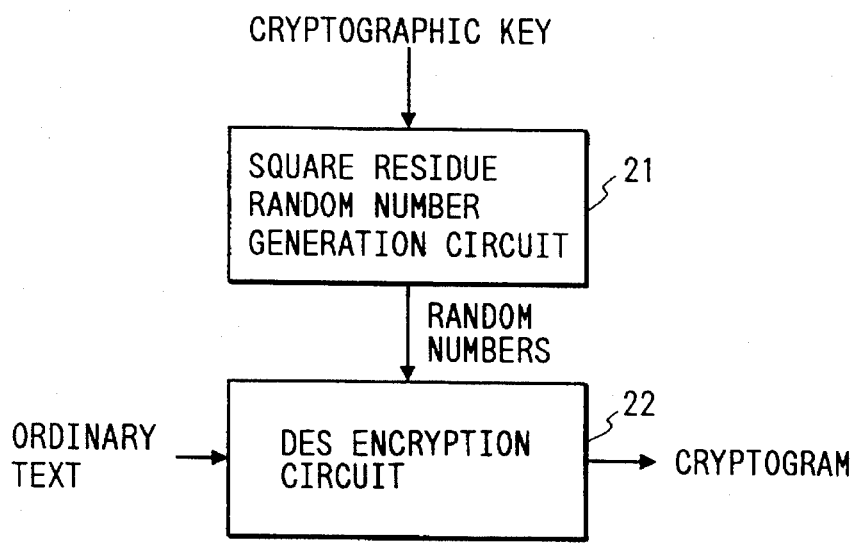
FIG. 2 shows an encryption apparatus when the DES is used as the system A and the square residue random number system is used as the system B.

FIG. 2 shows an embodiment which uses the DES encryption circuit 22 as the encryption circuit 12 of the system A of FIGS. 1A and 1B and the square residue random number generation circuit 21 as the random number generation circuit of the system B. In the present embodiment, since the conversion system of the DES encryption is controlled by the cryptographic key of the DES, the cryptographic key of the DES encryption is changed by the random number from the random number generation circuit of the system B.

As described above, the security of the DES is becoming questionable as a powerful cryptoanalysis method called the differential cryptoanalysis method was proposed, and as a countermeasure, a system to change the key depending on an intermediate value of a final value of the DES has been proposed.

However, this system may somewhat improve the security but no vigorous analysis is made as it was for the prior art DES and the security is not assured. Further, since the change of the key depends on the intermediate value or the final value in the DES, it is highly possible that it may be cryptoanalyzed by an improved method of the differential cryptoanalysis method. On the other hand, the present system which changes the key of the DES by the system B which assures the high security is very secure.

In the apparatus of FIG. 2 which uses the square residue random number system as the system B, the encryption procedure is as follows:

1) A cryptographic key is set as an initial value in the square residue random number generation circuit.

2) The square residue random number generation circuit generates a portion or all of the 56-bit random number based on the given initial value and outputs it to the DES circuit as a first cryptographic key of the DES.

3) The DES circuit converts an input ordinary text to a cryptograph in accordance with the given cryptographic key and outputs it.

4) The square residue random number generation circuit calculates a portion or all of the 56-bit random number used as the next cryptographic key of the DES before the number of output cryptograms exceeds the number required for the cryptoanalysis of the cryptographic key of the DES, and outputs it to the DES circuit.

5) The steps 3) and 4) are then repeated.

In this procedure, all or a portion of the cryptograms outputted in the step 3 are the cryptograms which are generated in the present embodiment.

Since the square residue random number generation circuit 21 may be realized by the repetition of the residue multiplication of X·Y mod N, it may be implemented by a hardware configuration or by software calculation by a CPU.

[Embodiment 2]

Figure 3:
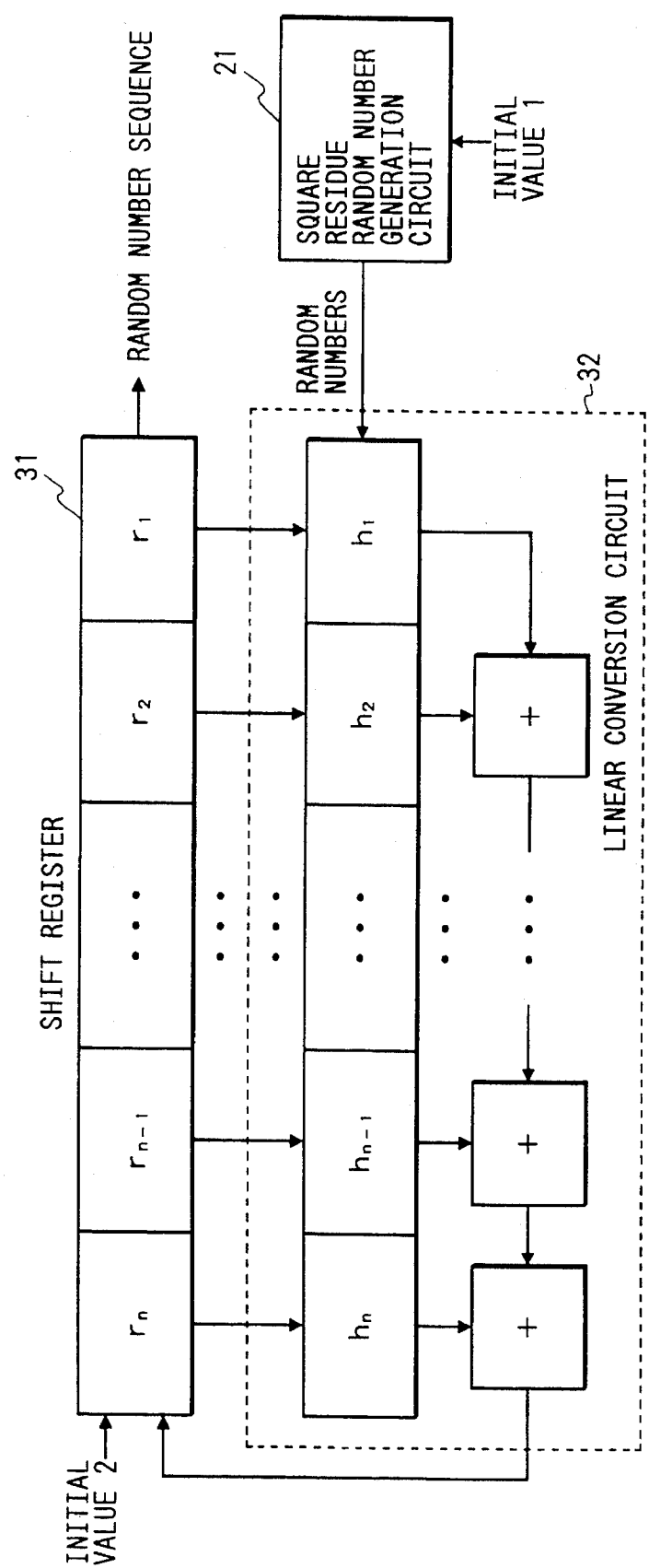
FIG. 3 shows a random number generation circuit when the LFSR is used as the system A and the square residue random number system is used as the system B.

FIG. 3 shows a block diagram when the LFSR system is used as the system A and the square residue random number system is used as the system B. The LSFR in FIG. 3 comprises n-stage shift registers $R(t)=[r_n(t), r_{n-1}(t), \ldots, r_2(t), r_1(t)]$ and a tap train $[h_n, h_{n-1}, \ldots, h_2, h_1]$. The values of the tap train $[h_n, h_{n-1}, \ldots, h_2, h_1]$ are determined by the random numbers from the system B.

The procedure of the random number generation in the present embodiment is as follows, in which steps 4) to 6) are simultaneously conducted.

1) Initial values are set in the shift register 31 and the square residue random number generation circuit 21.

2) The square residue random number generation circuit 21 generates a random number based on the given initial value and outputs it to a linear conversion circuit 32 by the LFSR as a first parameter.

3) The linear conversion circuit determines the values of the tap train, that is, the linear conversion system in accordance with the parameter given in the step 2.

4) Each register shifts right the given value.

5) The value of the rightmost register is outputted as the random number.

6) $r_1 \cdot h_1 + r_2 \cdot h_2 + \ldots + r_n \cdot h_n$ is calculated in accordance with the determined linear conversion and it is fed back to the leftmost register.

7) The steps 4) to 6) are then repeated. The square residue random number generation circuit 21 calculates a portion or all of the random number to be used as the next parameter before the number of random numbers outputted from the LFSR exceeds the number of random numbers required to cryptoanalyze the values of the tap train of the LFSR (in the present embodiment, it is equal to the double of the number of stages of the shift register), and outputs it to the linear conversion circuit 32 comprising the LFSR to change the linear conversion system.

In the above procedure, all or a portion of the values outputted in the step 5) are the random numbers generated in the present embodiment. The initial value of the system A in step 1 may be a portion of the cryptographic key or a value given by other means.

Figure 4:
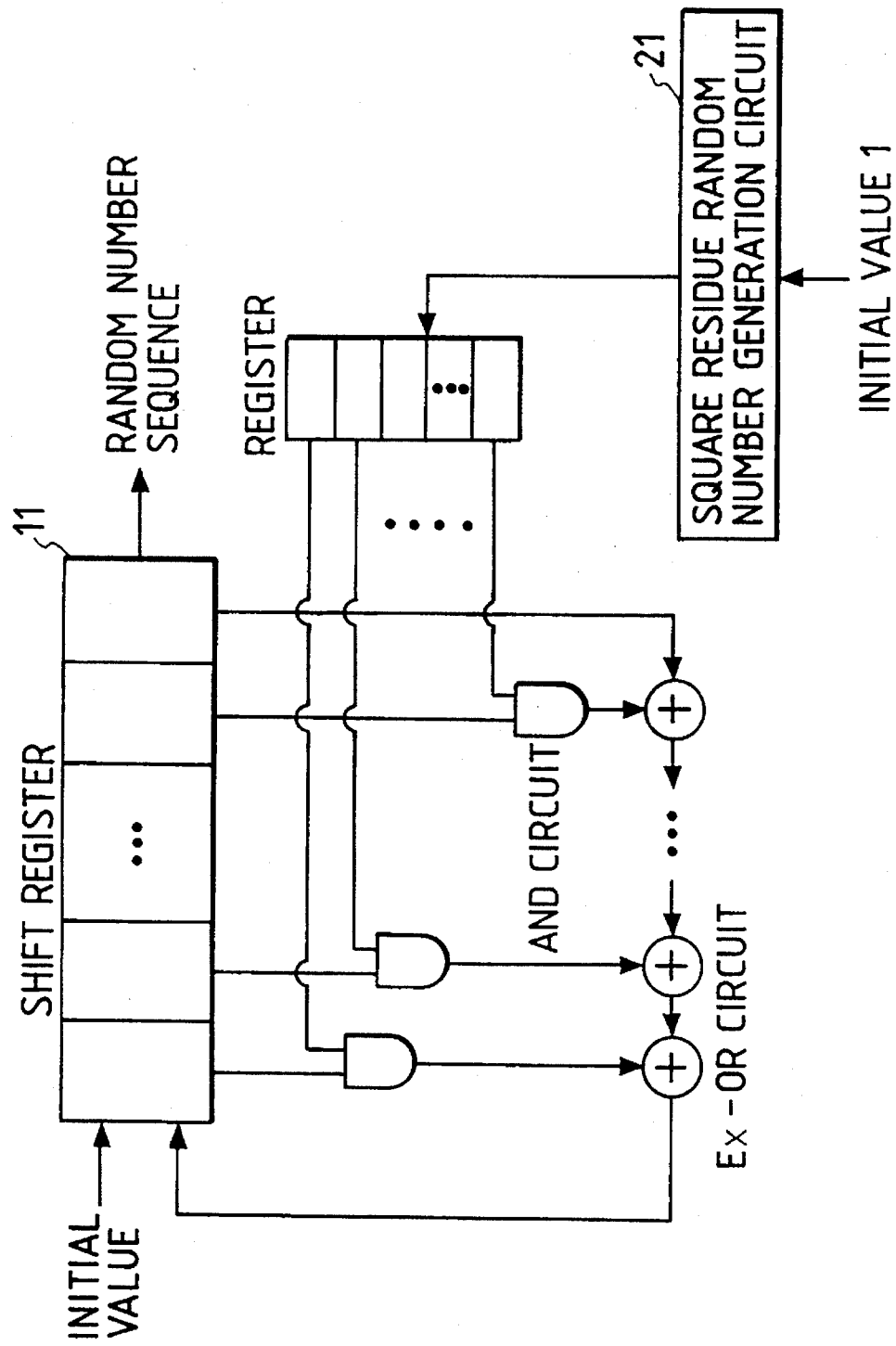
FIG. 4 shows a detailed block diagram of a random number generation circuit which uses an AND circuit for the linear conversion.

A random number generation circuit which uses an AND circuit as the linear conversion circuit is shown in FIG. 4. In FIG. 4, an initial value is first set in the shift register. Since the value of the register connected to the AND circuit represents the values $h_n, h_{n-1}, \ldots, h_2, h_1$ of the tap train, the change of the value of the register causes the change of the linear conversion system. If the value of the register is changed by the change of the parameter before the number of output random number sequences exceeds the double of the number of stages of the shift register, the formula (2) cannot be solved and the random number sequence cannot be cryptoanalyzed.

In the step 6, after the number of output random numbers has exceeded the double of the linearity complexity determined by the random number sequences, the parameter unpitied to the linear conversion circuit is changed so that only the linear conversion system is analyzed by the formula (2) even if the linear conversion system is changed. Thus, the cryptoanalysis of the subsequent random number sequences is prevented and the security is assured after the change of the linear conversion system by the parameter.

Figure 5:
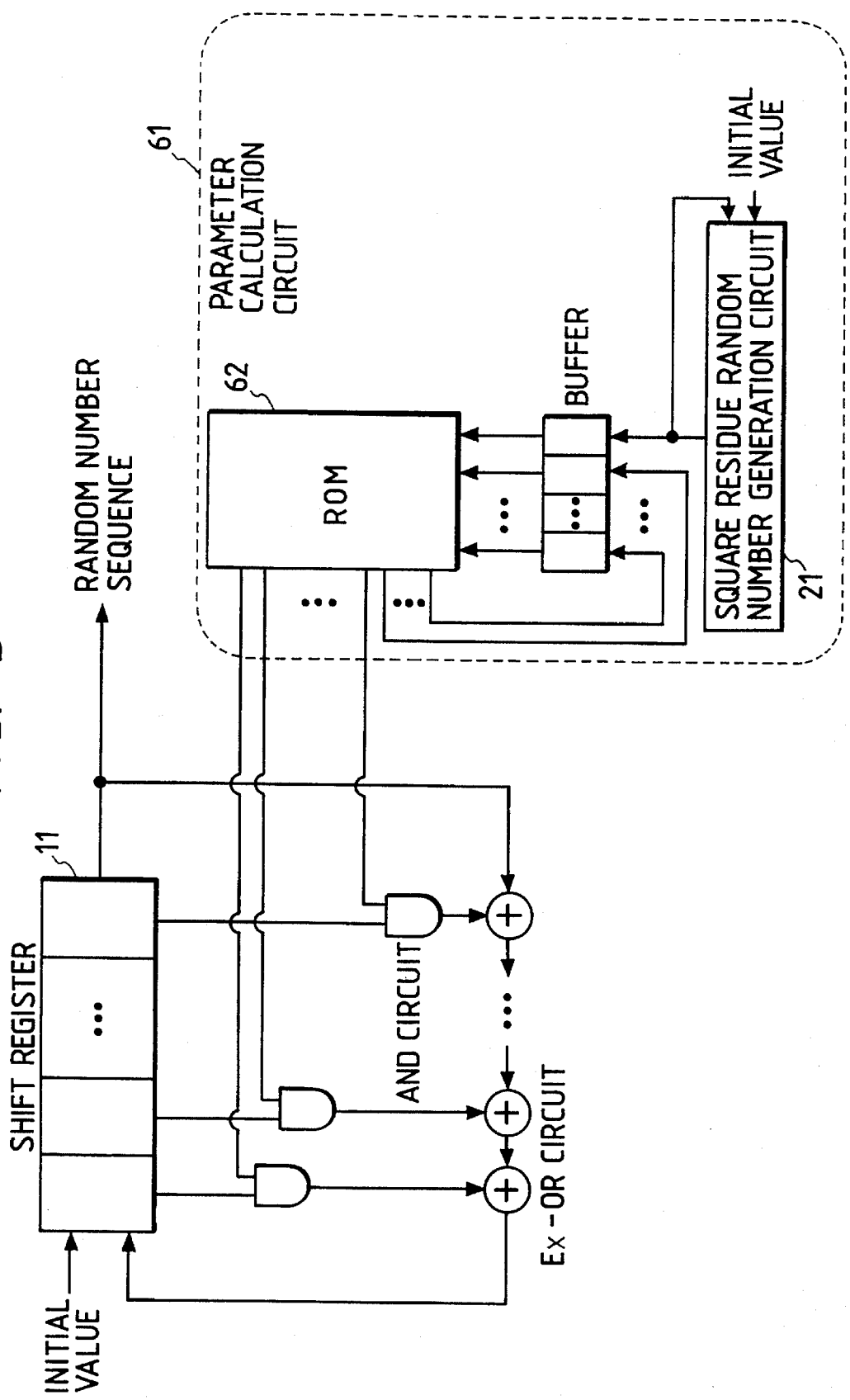
FIG. 5 shows a detailed block diagram of a random number generation circuit which uses the LFSR.

As shown in FIG. 5, by combining the cryptologically secure pseudo-random number generation method and the feedback of a ROM 62 whose content is kept secret, a parameter calculation circuit 61 based on the system B may be constructed.

Even by only the feedback of the ROM whose content is kept secret, the parameter generation means based on the system B may be constructed because the remaining values of the ROM cannot be detected from the values of the ROM so far generated.

While the control by only the parameters generated by the parameter calculation circuit has been described as to the control of the conversion system of the random number generation means, the control may be done by the combined parameter of the parameter in the random number generation means and the parameter calculated by the parameter calculation circuit.

[Embodiment 3]

In the random number generation circuit by the LFSR system shown in the Embodiment 2, the number of random numbers required to cryptoanalyze the output random number sequences is equal to the double of the number of stages of the LFSR. When the non-linear feedback shift register is used as the system A, the number of random numbers required for the cryptoanalysis may be set to be larger than that of the LFSR system. Accordingly, the operation speed of the system B for changing the conversion system of the system A may be lower.

Figure 6:
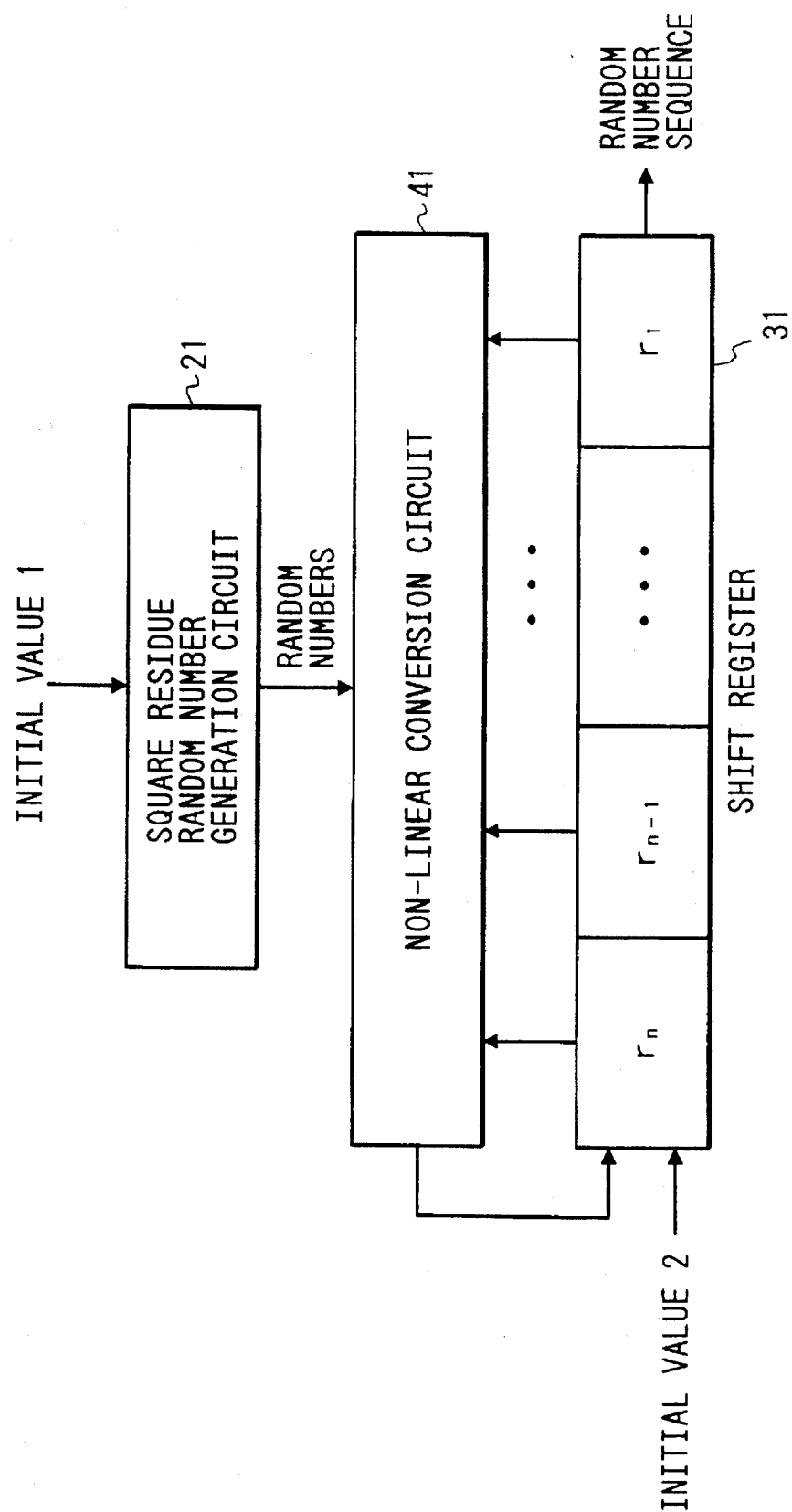
FIG. 6 shows a random number generation circuit when a non-linear feedback register is used as the system A and the square residue random number system is used as the system B.

An embodiment which uses the non-linear feedback shift register is shown in FIG. 6, which shows a block diagram of the random number generation circuit when the non-linear feedback shift register of the present invention is used.

As the random number generation circuit based on the system A, a shift register 31 and a non-linear conversion circuit 41 for non-linearly converting the values of the shift register 31 and feeding it back to the shift register 31 are used, and the square residue random number generation circuit 21 is used as the random number generation circuit of the system B.

The procedure of the random number generation in the present embodiment is as follows, in which steps 4) to 6) are simultaneously performed.

1) Initial values are set in the shift register 31 and the square residue random number generation circuit 21.

2) The square residue random number generation circuit 21 generates the random number based on the given initial value and outputs it to the non-linear conversion circuit 41 as a first parameter.

3) The non-linear conversion circuit 41 determines the non-linear conversion in accordance with the parameter given by the step 2).

4) Each register shifts right the given value.

5) The value of the rightmost register is outputted as the random number.

6) The value of each register is feedback-converted in accordance with the non-linear conversion determined in the step 3) and it is set as the value of the leftmost register.

7) The steps 4) to 6) are repeated. The square residue random number generation circuit 21 calculates a portion or all of the random numbers to be used as the next parameter before the number of output random numbers exceeds the number of random numbers required to cryptoanalyze the random number sequences, and outputs it to the non-linear conversion circuit 41 to change the non-linear conversion system.

In this procedure, all or a portion of the values outputted in the step 5) are the random numbers generated in the present embodiment. As a specific configuration of the non-linear conversion circuit 41, a ROM which stores input and output relations of a known non-linear function or the DES may be used.

[Embodiment 4]

In the Embodiments 2 and 3, the linear and non-linear feedback shift registers are used to facilitate the understanding of the present invention but the essence of those embodiment resides in the ability to control the conversion system by the externally given parameters in the random number generation system which sequentially generates the random numbers by the predetermined conversion and the feedback based on the given initial value, and more particularly, the change of the parameter which controls the conversion system before a number of random number sequences required for determining the conversion system are outputted to change the conversion system. From the above, it should be understood that the random number generation system is not limited to the linear and non-linear feedback registers but various other systems may be used.

As to the conversion system in the feedback conversion, the control by the externally given parameter has been described. Alternatively, a combined parameter of the externally given parameter and an internally generated parameter may be used for the control.

Figure 7:
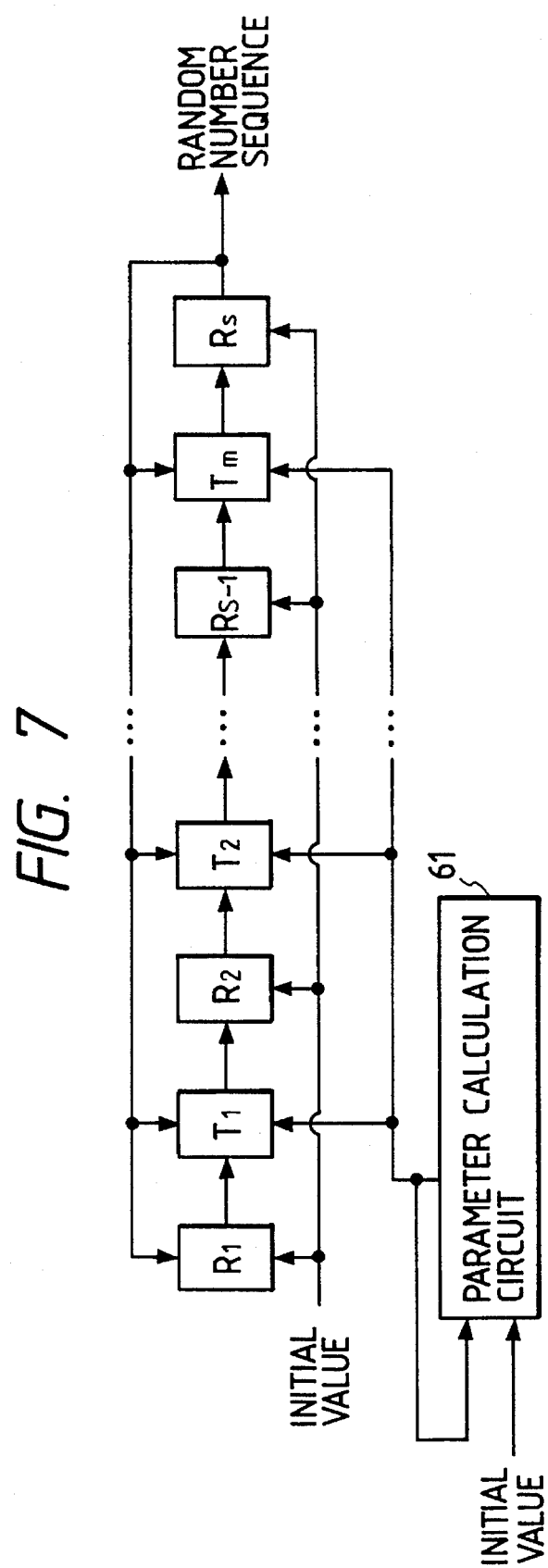
FIG. 7 shows a block diagram of a random number generation circuit which uses a plurality of registers.

In FIG. 7, no shift register is used in the procedure for generating the random number.

In the present embodiment, s registers $R_1$–$R_s$ which are operated by the same clock and m (non) linear conversion circuits $T_1$–$T_m$ which effect the (non) linear conversion by the outputs from the respective registers and the final register ($R_s$) and output it to the next register are used as the random number generation circuit by the system A, and a parameter calculation circuit 61 by the system B is provided. Each (non) linear conversion system is controlled by the output from the parameter calculation circuit 61.

The procedure of the random number generation in the present embodiment is as follows, in which steps 4), 5) and 6) are simultaneously performed, 1) Initial values are set in the respective registers and the parameter calculation circuit 61.

2) The parameter calculation circuit 61 calculates a first parameter based on the given initial value and outputs it to the respective (non) linear conversion circuits.

3) The (non) linear conversion circuits $T_1$–$T_m$ determine the (non) linear conversions in accordance with the parameters given in the step 2).

4) The value of the rightmost register ($R_s$) is outputted as the random number and set in the leftmost register ($R_1$).

5) Each register outputs the value held in the step 4) and holds the value at the input.

6) Each (non) linear conversion circuit converts the value outputted from the preceding stage register and the feedback output from the register $R_s$ by the (non) linear conversion determined in the step 3) and outputs it to the succeeding register.

7) The steps 4), 5) and 6) are repeated. In order to prevent the cryptoanalysis of the output random number sequences by the formula (2), the parameter calculation circuit calculates the next parameter before the number of output random numbers exceeds the number of random numbers required to cryptoanalyze the random number sequences, and outputs it to the respective (non) linear conversion circuits to change the respective (non) linear conversion systems.

In this procedure, all or a portion of the output of $R_s$ are the random numbers generated by the present embodiment.

In this procedure, each (non) linear conversion circuit may perform different (non) linear conversion from each other.

[Embodiment 5]

In the Embodiments 1–4, the LFSR system, the non-linear feedback register system and the DES are used as the system A in order to facilitate the understanding of the embodiments although the system A may be a system which realizes the high speed encryption (or the random number generation) even if the security is not assured. Accordingly, it may be a system which belongs to the Feistel encryption such as FEAL.

As the system B, the square residue random number system is used although it may be another system which assures the security by the factorization or the discrete logarithm problem such as the RSA random number or the discrete logarithm random number.

In the circuit of the system A, the random number from the system B need not be used as it is as the parameter but it may converted by a ROM or the number of output bits may be changed by the expansion transposition.

The essence of the above embodiments resides in the continuous or intermittent control of the cryptographic key of the system A whose security is not assured by the system B whose security is assured without resharing by the redistribution of the key. Where the number of cryptograms (or the random number sequences) required for the cryptoanalysis of the system A is known, the conversion system or the cryptographic key of the system A is changed by the system B before the system A outputs a number of cryptograms (or random number sequences) required for the cryptoanalysis. In this case, however, the circuit for implementing the system A or the system B need not be one but it may be a combination of two or more circuits belonging to the same system. Various combinations may be used and an example thereof is shown in FIGS. 8A and 8B.

Figure 8A:
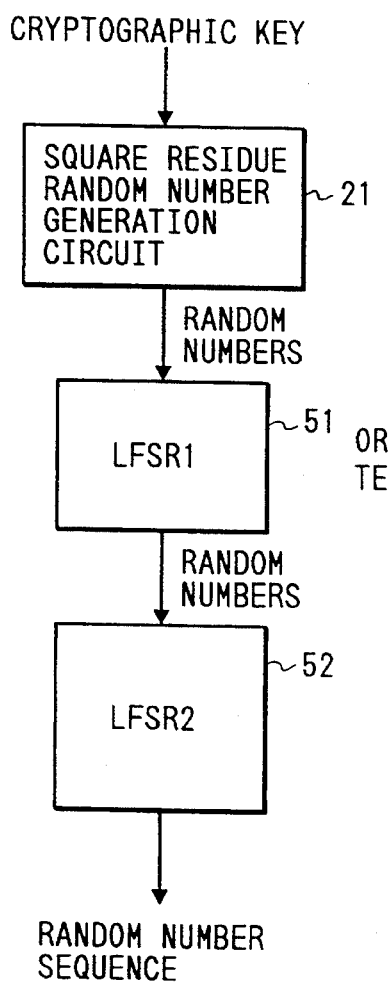
FIGS. 8A and 8B show a random number generation circuit when two different LFSR's are used and an encryption apparatus when two different random number generation systems system are used.

In FIG. 8A, the conversion system of LFSR1 is controlled by the square residue random number and the conversion system of LFSR2 is controlled by the random number from the LFSR1. When the process of the LFSR2 is much faster than the process of the square residue random number generation circuit 21, the output of the square residue random number generation circuit 21 is expanded by the LFSR1 to speed up the operation. In this case, a combination of the LFSR1 and the LFSR2 may be considered as the random number generation circuit of the system A, or a combination of the square residue random number generation circuit 21 and the LFSR1 may be considered as the circuit of the system B because the security of the combination of the square residue random number and the LFSR is assured in the Embodiment 2.

Figure 8B:
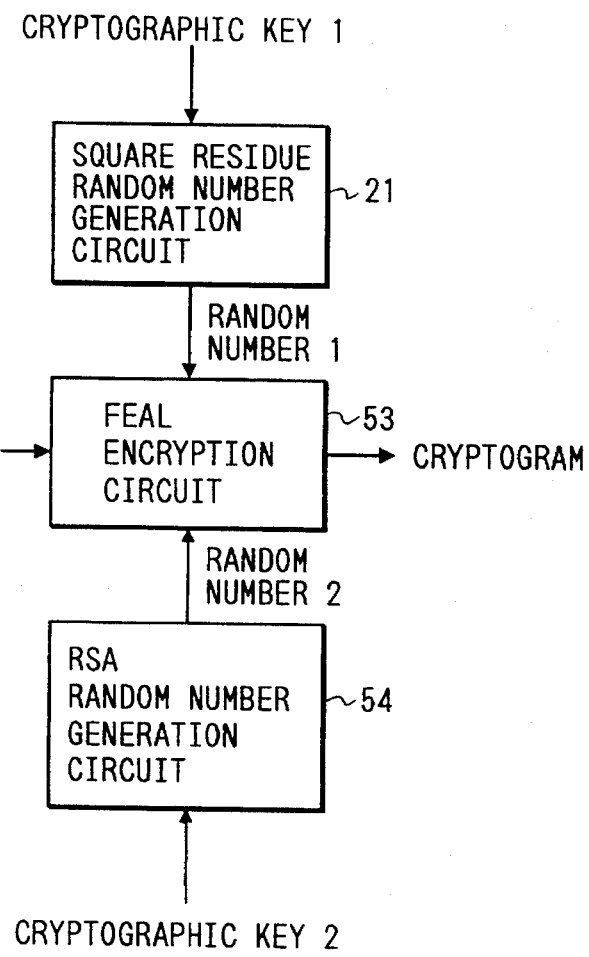

In FIG. 8B, a cryptographic key of a FEAL encryption circuit 53 is controlled by two different random numbers generated by the square residue random number generation circuit 21 and a RSA random number generation circuit 54 both belonging to the system B. In this case, the cryptographic key of the FEAL, may be a sum or a product of a random number 1 and a random number 2, or the random number 1 and the random number 2 may be alternately used.

[Embodiment 6]

As described above, since the cryptogram output (or the random number sequence) generated by the above encryption system (or the random number generation system) is very fast to the cryptoanalysis, a cryptographic communication system which is resistive to the cryptoanalysis and can attain high speed processing may be attained by using the present encryption system (or the random number generation system) in the communication. An embodiment of the cryptographic communication network when the encryption system of the above embodiments is used is now explained.

Figure 9:
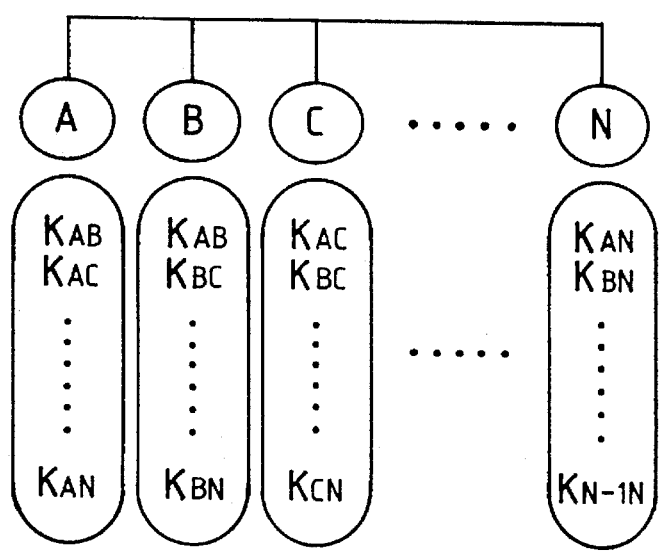
FIG. 9 illustrates a shared key cryptographic communication network.

FIG. 9 shows a shared cryptographic key communication network in which a unique and secret cryptographic key is shared by subscribers of the network. A, B, C, ..., N denote subscribers of the network, $K_{AB}$, $K_{AC}$, ..., denote a cryptographic key shared by the subscribers A and B, a cryptographic key shared by the subscribers A and C, ....

FIG. 7 shows a block diagram of a configuration of the communication apparatus of the present embodiment which includes an encryption/decryption apparatus using the encryption circuit of the system A in the above embodiment and the random number generation circuit 11 of the system B.

Figure 10:
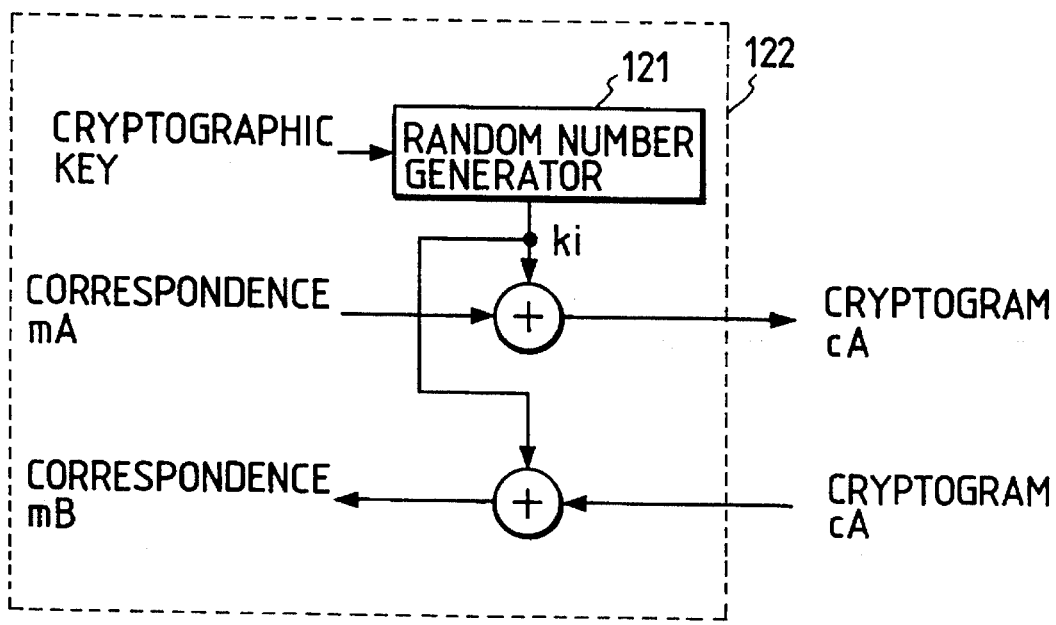
FIG. 10 shows a block diagram of a communication apparatus including the encryption apparatus and the decryption apparatus.
Figure 11:
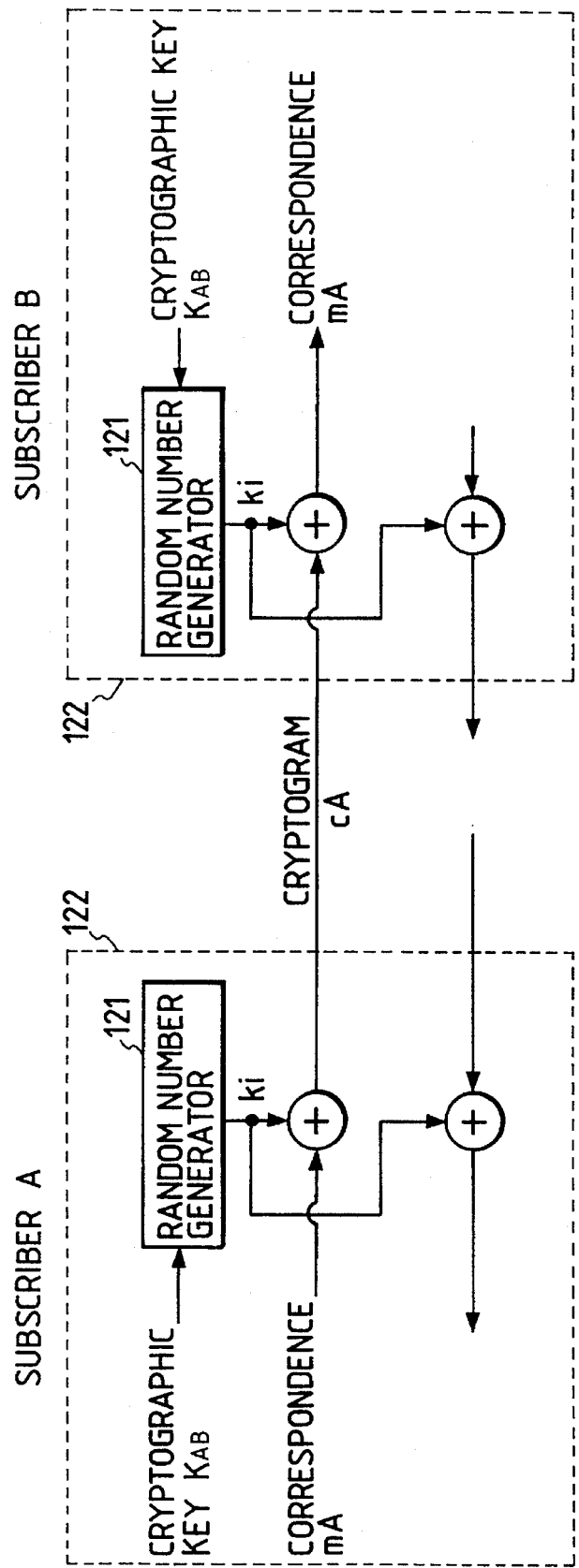
FIG. 11 shows a communication system which performs secret communication.
Figure 12:
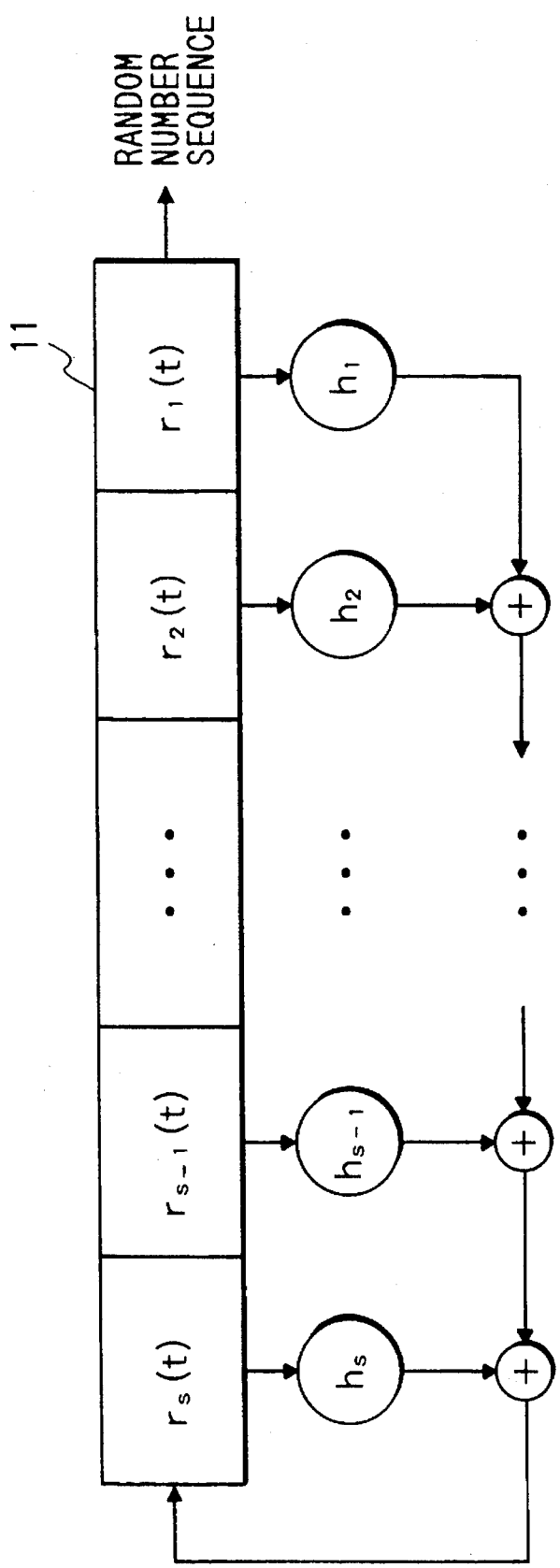
FIG. 12 shows a block diagram of a prior art random number generation circuit which uses the LFSR.

FIG. 11 shows a secret communication between the subscribers A and B in the cryptographic communication system shown in FIGS. 9 and 10.

The cryptographic communication from the subscriber A to the subscriber B is conducted in the following manner in which it is assumed that the initial condition is i=1.

1) The sender A of the communication sets all or a portion of the secret key $K_{AB}$ shared by the receiver B as an initial value of the random number generation circuit 11 of the system B to generate i-th random number sequence $K_i$.

2) The sender A exclusively ORs the text message mA with $K_i$ bit by bit by using the generated random number sequence $K_i$ as the cryptographic key of the system A to encrypt it, and sends the cryptogram cA to the receiver B.

3) The receiver B of the communication also sets all or a portion of the secret key $K_{AB}$ shared by the sender A as an initial value of the random number generation circuit 11 of the system B to generate the same random number sequence $K_i$ as that generated by the sender A.

4) The receiver B also logically ORs the cryptogram cA with $K_i$ bit by bit by using the generated random number sequence $K_i$ as the cryptographic key of the system A for the cryptoanalysis as the sender A did.

5) The sender A causes the random number generation circuit 11 to generate the i=(i+1)th random number sequence before the number of cryptograms to be transmitted to the receiver B exceeds the number required to cryptoanalyze the system A, and sets $K_i$.

6) The steps 2) to 5) are repeated.

In this procedure, since only the authorized receiver B knows the key $K_{AB}$, the receiver B can cryptoanalyze the received cryptogram cA to the original text message mA and other subscribers (C–N) who are unaware of the secret key used for the encryption cannot detect the content. In this manner, the secret communication is attained.

[Embodiment 7]

In a network in which a cryptographic key is not previously distributed as it is in FIG. 9 but the cryptographic key is shared by the sender and the receiver by the distribution of the cryptographic key, the cryptographic communication may be realized in the same procedure. In this case, once the key is distributed, the secure updating of the cryptographic key is effected by the system B so that there is no need to update the cryptographic key by the frequent distribution.

[Embodiment 8]

In the cryptographic communication system shown in FIG. 6, the sender and the receiver of the communication message share the unique and secret key. Thus, the reception of the cryptogram and the cryptoanalysis to the valid message text assure the receiver that the message text has been sent from another owner of the key. Thus, in the secret communication system of FIG. 6, the certification of the sender and the receiver of the communication may be conducted.

[Embodiment 9]

In a network in which the cryptographic key is not previously distributed as it is in the Embodiments 6 and 8 but the cryptographic key should be shared by the sender and the receiver prior to the cryptographic communication, a Diffie-Hellman system (W. Diffie and M. E. Hellman "New Directions in Cryptography", IEEE, IT, Vol. IT-22, No. 6, 1976) has been well known as a system which allows the secured sharing of the cryptographic key even in a communication path which is subject to unauthorized reception. The random number used therefor may be the random number generated by the above embodiments.

Since the random number used therefor need not be same for the sender and the receiver, the initial values set in the random number generation circuit of the systems A and B may be any values.

In accordance with the present invention, the parameter of the system A is changed based on the random number outputted from the output sequence in the system (system B) which is hard to be cryptoanalyzed before the number of outputs outputted from a predetermined number of output sequences in the system (system A) which is easy to be cryptoanalyzed, or in the vicinity of the equality of both numbers so that the collection of the outputs sufficient to cryptoanalyze the system A is rendered difficult and the security of the system A is enhanced.

In this case, since it is sufficient to output the random number in the system B before the number of outputs outputted by from the system A exceeds the number required to cryptoanalyze the system A, the random number of the system B need not be generated at a high speed. However, the high speed encryption is attained because the final output is the output from the system A.

As to the security, the collection of a number of outputs which are sufficient to cryptoanalyze the system A is rendered difficult. Even if the number of outputs required to cryptoanalyze the system A is reduced in the future by the progress of study, only the random number unpitied to the system A from the system B can be cryptoanalyzed and it is difficult in terms of amount of calculation to cryptoanalyze the cryptographic key of the system B based on the random number. Accordingly, the security of the encryption by the present invention is as high as that of the system B.

By using the present encryption to the cryptographic communication, high speed and high security cryptographic communication can be attained.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An encryption apparatus comprising:

random number generation means for sequentially generating random number sequences using a first cryptographic key shared by a sender and a receiver as an initial value; and encryption means for encrypting communication data based on a second encryption key and sequentially outputting the cryptographic sequences, wherein the encryption of one of the communication data is faster than the generation of one random number by said random number generation means and the number of random numbers necessary for cryptoanalyzing the random number sequence is greater than that of the encrypted communication data necessary for cryptoanalyzing the cryptographic sequence, and the second encryption key is sequentially updated based on the random number whenever a predetermined number of communication data is encrypted.

2. An encryption apparatus according to claim 1, wherein the cryptographic sequences outputted by said encryption means are cryptoanalyzable based on more than a predetermined number of output sequences, and the parameters are updated based on said predetermined number.

3. An encryption apparatus according to claim 1, wherein said encryption means includes second random number generation means for generating a random number sequence which allows the cryptoanalysis of the sequences based on more than a predetermined number of output sequences.

4. An encryption apparatus according to claim 1, wherein a plurality of encryption means are included.

5. An encryption apparatus according to claim 1, wherein a plurality of random number generation means are included.

6. An encryption apparatus according to claim 1, wherein Feistel cryptology is used as the cryptology of said encryption means.

7. An encryption apparatus according to claim 1, wherein said encryption means includes a feedback shift register.

8. An encryption apparatus according to claim 1, wherein said random number generation means includes means for performing a square residue operation and outputting several low order bits of the operation result.

9. An encryption apparatus according to claim 1, wherein said random number generation means includes means for generating RSA random numbers.

10. An encryption apparatus according to claim 1, wherein said random number generation means includes means for generating discrete logarithm random numbers.

11. An encryption apparatus according to claim 1, wherein said random number generation means includes means for generating inverse random numbers.

12. A random number generator comprising:

hold means for holding data;

calculation means for sequentially calculating parameter sequences and outputting a parameter;

conversion means for receiving the data held by said hold means and converting the received data based on the parameter output from said calculation means;

update means for updating the data held by said hold means in accordance with the conversion result by said conversion means; and output means for sequentially outputting a portion of the data held by said hold means as random number sequences, wherein the conversion of the data held by said hold means is faster than the calculation of one parameter by said calculation means and the number of parameters necessary for cryptoanalyzing the parameter sequence is greater than that of the random number sequence and the parameter is updated whenever the held data is updated a predetermined number of times.

13. A communication system comprising:

a transmission unit including first random number generation means for sequentially generating random number sequences using a first cryptographic key shared by a sender and a receiver as an initial value, and encryption means for encrypting communication data based on a second encryption key and sequentially outputting the cryptographic sequences, wherein the encryption of one of the communication data is faster than the generation of one random number by said random number generation means and the number of random numbers necessary for cryptoanalyzing the random number sequence is greater than that of the encrypted communication data necessary for cryptoanalyzing the cryptographic sequence; and a receiver unit including second random number generation means for generating the same random number sequences as those of said first random number generation means while using first the cryptographic key as an initial value and cryptoanalysis means for cryptoanalyzing the cryptograms by inverse operation by said encryption means based on the second encryption key to sequentially output communication texts, wherein the second encryption key is sequentially updated based on the random number whenever a predetermined number of communication data is encrypted.

14. A communication system comprising:

a transmission unit including first hold means for holding data, first calculation means for sequentially calculating parameter sequences and outputting a parameter, first conversion means for receiving the data held by said first hold means and converting the received data based on the parameter output from said first calculation means, first update means for updating the data held by said first hold means in accordance with the conversion result by said first conversion means, first output means for sequentially outputting a portion of the data held by said first hold means as random number sequences, wherein the conversion of the data held by said first hold means is faster than the calculation of one parameter by said first calculation means and the number of parameters necessary for cryptoanalyzing the parameter sequence is greater than that of the random number sequence and the parameter is updated whenever the held data is updated a predetermined number of times, and encryption means for encrypting communication text based on the random number sequences outputted by said first output means; and a receiver unit including second hold means for holding data, second calculation means for sequentially calculating parameter sequences and outputting a parameter, second conversion means for receiving the data held by said second hold means and converting the received data based on the parameter output from said second calculation means, second update means for updating the data held by said second hold means in accordance with the conversion result by said second conversion means, second output means for sequentially outputting a portion of the data held by said second hold means as random number sequences, wherein the conversion of the data held by said second hold means is faster than the calculation of one parameter by said second calculation means and the number of parameters necessary for cryptoanalyzing the parameter sequence is greater than that of the random number sequence and the parameter is updated whenever the held data is updated a predetermined number of times, and cryptoanalysis means for cryptoanalyzing cryptograms based on the random number sequences outputted by said second output means.

15. A communication method comprising the steps of:
in a transmission station,
sequentially generating random number sequences using a first cryptographic key shared by a sender and a receiver as an initial value; and
sequentially transmitting to the receiver cryptograms by encrypting communication texts based on a second encryption key that is sequentially updated based on the random number whenever a predetermined number of communication data is encrypted, wherein the encryption of one of the communication data is faster than the generation of one random number and the number of random numbers necessary for cryptoanalyzing the random number sequence is greater than that of the encrypted communication data necessary for cryptoanalyzing the cryptographic sequence; and
in a receiving station,
sequentially generating the same random number sequences as said random number sequences while using said first cryptographic key as an initial value; and
sequentially outputting communication texts by cryptoanalyzing the cryptograms by inverse operation to the encryption based on the second encryption key sequentially updated.

16. A communication method comprising the steps of:
in a transmitting station,
inputting data held by a first data hold unit to a first conversion unit;
sequentially calculating parameter sequences and outputting a parameter with first calculation means;
converting the input data based on the parameter output from said first calculation means;
updating the data held in said first hold unit based on the conversion result;
sequentially outputting a portion of data held in said first hold unit as random number sequences; and
sequentially transmitting to a receiving station cryptograms encrypted based on the output random number sequences, wherein the conversion of the data held by said first hold unit is faster than the calculation of one parameter by said first calculation means and the number of parameters necessary for cryptoanalyzing the parameter sequence is greater than that of the random number sequence and the parameter is updated whenever the held data is updated a predetermined number of times; and
in the receiving station,
inputting data held by a second data hold unit to a second conversion unit;
sequentially calculating parameter sequences and outputting a parameter with second calculation means;
converting the input data based on the parameter output from said second calculation means;
updating the data held in said second hold unit based on the conversion result;
[sequentially calculating parameter sequences which are difficult to be inferred from output sequences as the parameters; to change the parameters;
sequentially outputting a portion of data held in said second hold unit as random number sequences; and
cryptoanalyzing the cryptograms based on the output random number sequences, wherein the conversion of the data held by said second hold unit is faster than the calculation of one parameter by said second calculation means and the number of parameters necessary for cryptoanalyzing the parameter sequence is greater than that of the random number sequence and the parameter is updated whenever the held data is updated a predetermined number of times.

* * * * *

UNITED STATES PATENT AND TRADEMARK OFFICE
CERTIFICATE OF CORRECTION

PATENT NO. : 5,600,720  Page 1 of 4
DATED : February 4, 1997
INVENTOR(S) : KEIICHI IWAMURA, ET AL.

It is certified that error appears in the above-indentified patent and that said Letters Patent is hereby corrected as shown below:

ON THE COVER PAGE:

Item: [56] References Cited

U.S. PATENT DOCUMENTS

"5,073,935   12/1993   Pastor" should read
--5,073,935   12/1991   Pastor--.

OTHER PUBLICATIONS

"Procedures Of Crypto 82" should read --Proceedings of Crypto 82--;

COLUMN 1:

Line 34, "a" should be deleted.

COLUMN 2:

Line 59, "McGraw-Hills Books" should read --McGraw-Hill Book--.

UNITED STATES PATENT AND TRADEMARK OFFICE
CERTIFICATE OF CORRECTION

PATENT NO. : 5,600,720
DATED : February 4, 1997
INVENTOR(S) : KEIICHI IWAMURA, ET AL.

It is certified that error appears in the above-indentified patent and that said Letters Patent is hereby corrected as shown below:

COLUMN 3:

Line 52, "is" should read --are--.
    Line 66, "poly(n)" should read --poly(log N)--.

COLUMN 6:

Line 2, "received" should read --receiver--.

COLUMN 7:

Line 11, "LFSR," should read --LFSR.--.
    Line 29, "and" should be deleted.
    Line 64, "cpyptoanalyzes" should read --cryptoanalyses--.

UNITED STATES PATENT AND TRADEMARK OFFICE
CERTIFICATE OF CORRECTION

PATENT NO. : 5,600,720
DATED : February 4, 1997
INVENTOR(S) : KEIICHI IWAMURA, ET AL.

It is certified that error appears in the above-indentified patent and that said Letters Patent is hereby corrected as shown below:

COLUMN 8:

Line 19, "unpitied" should read --emptied--.
    Line 21, "tion." should read --tion--.

COLUMN 10:

Line 9, "unpitied" should read --emptied--.

COLUMN 11:

Line 58, "performed," should read --performed--.

COLUMN 14:

Line 65, "by" should be deleted.

COLUMN 15:

Line 7, "unpitied" should read --emptied--.

UNITED STATES PATENT AND TRADEMARK OFFICE
CERTIFICATE OF CORRECTION

PATENT NO. : 5,600,720      Page 4 of 4
DATED : February 4, 1997
INVENTOR(S) : KEIICHI IWAMURA, ET AL.

It is certified that error appears in the above-indentified patent and that said Letters Patent is hereby corrected as shown below:

COLUMN 18:

Lines 37 to 39 should be deleted.

Signed and Sealed this

Ninth Day of September, 1997

Attest:

BRUCE LEHMAN

Attesting Officer

Commissioner of Patents and Trademarks